(12) United States Patent
Li et al.

(10) Patent No.: US 8,932,510 B2
(45) Date of Patent: Jan. 13, 2015

(54) METHODS FOR LASER CUTTING GLASS SUBSTRATES

(75) Inventors: Xinghua Li, Horseheads, NY (US); Lisa Anne Moore, Corning, NY (US)

(73) Assignee: Corning Incorporated, Corning, NY (US)

( * ) Notice: Subject to any disclaimer, the term of this patent is extended or adjusted under 35 U.S.C. 154(b) by 295 days.

(21) Appl. No.: 12/824,609

(22) Filed: Jun. 28, 2010

(65) Prior Publication Data

US 2011/0049765 A1    Mar. 3, 2011

Related U.S. Application Data

(60) Provisional application No. 61/237,728, filed on Aug. 28, 2009.

(51) Int. Cl.
| | |
|---|---|
| *B23K 26/00* | (2014.01) |
| *C03B 33/09* | (2006.01) |
| *B23K 26/40* | (2014.01) |
| *C03C 23/00* | (2006.01) |

(52) U.S. Cl.
CPC ............... *C03B 33/093* (2013.01); *B23K 26/00* (2013.01); *B23K 26/4075* (2013.01); *C03C 23/0025* (2013.01)
USPC ...................................................... 264/400

(58) Field of Classification Search
CPC .................. B23K 26/0054; B23K 26/0057
USPC ...................................................... 264/400
See application file for complete search history.

(56) References Cited

U.S. PATENT DOCUMENTS

| | | |
|---|---|---|
| 2,959,507 A | 11/1960 | Long |
| 3,453,097 A | 7/1969 | Hafner |
| 3,543,979 A | 12/1970 | Grove et al. |
| 3,629,545 A | 12/1971 | Graham et al. |
| 3,629,546 A | 12/1971 | Fry |
| 3,751,238 A | 8/1973 | Grego et al. |
| 4,403,134 A | 9/1983 | Klingel |
| 4,467,168 A | 8/1984 | Morgan et al. |
| 4,468,534 A | 8/1984 | Boddicker |
| 4,639,572 A | 1/1987 | Gruzman et al. |

(Continued)

FOREIGN PATENT DOCUMENTS

| | | |
|---|---|---|
| EP | 0793132 A1 | 9/1997 |
| EP | 1341730 B1 | 8/2005 |

(Continued)

OTHER PUBLICATIONS

Machine Translation of JP 2004-352535 Publication Date Dec. 16, 2004.

(Continued)

*Primary Examiner* — Larry Thrower
*Assistant Examiner* — Xue Liu
(74) *Attorney, Agent, or Firm* — John T. Haran

(57) ABSTRACT

A method for cutting a glass article from a strengthened glass substrate having a surface compression layer and a tensile layer includes forming an edge defect in the surface compression layer on a first edge of the strengthened glass substrate. The method further includes propagating a through vent through the surface compression and tensile layers at the edge defect. The through vent precedes a region of separation along a cut line between the glass article and the strengthened glass substrate.

19 Claims, 9 Drawing Sheets

(56) References Cited

U.S. PATENT DOCUMENTS

| | | | |
|---|---|---|---|
| 4,702,042 A | 10/1987 | Herrington et al. | |
| 5,084,604 A | 1/1992 | Dekker et al. | |
| 5,132,505 A | 7/1992 | Zonneveld et al. | |
| 5,609,284 A | 3/1997 | Kondratenko | |
| 5,776,220 A | 7/1998 | Allaire et al. | |
| 5,783,289 A | 7/1998 | Suzuki et al. | |
| 5,826,772 A | 10/1998 | Ariglio et al. | |
| 5,961,852 A | 10/1999 | Rafla-Yuan et al. | |
| 5,984,159 A | 11/1999 | Ostendarp et al. | |
| 6,023,039 A | 2/2000 | Sawada | |
| 6,112,967 A | 9/2000 | Ostendarp et al. | |
| 6,211,488 B1* | 4/2001 | Hoekstra et al. | 219/121.72 |
| 6,252,197 B1 | 6/2001 | Hoekstra et al. | |
| 6,259,058 B1 | 7/2001 | Hoekstra | |
| 6,327,875 B1 | 12/2001 | Allaire et al. | |
| 6,420,678 B1 | 7/2002 | Hoekstra | |
| 6,423,930 B1 | 7/2002 | Matsumoto | |
| 6,489,588 B1 | 12/2002 | Hoekstra et al. | |
| 6,590,181 B2 | 7/2003 | Choo et al. | |
| 6,676,878 B2 | 1/2004 | O'Brien et al. | |
| 6,684,885 B2 | 2/2004 | Graczyk | |
| 6,723,952 B2 | 4/2004 | Choo et al. | |
| 6,734,391 B2 | 5/2004 | Jeon | |
| 6,744,009 B1 | 6/2004 | Xuan et al. | |
| 6,787,732 B1 | 9/2004 | Xuan et al. | |
| 6,800,831 B1 | 10/2004 | Hoetzel | |
| 6,811,069 B2 | 11/2004 | Hauer et al. | |
| 6,870,129 B2 | 3/2005 | Hauer et al. | |
| 6,894,249 B1 | 5/2005 | Hauer et al. | |
| 6,919,530 B2 | 7/2005 | Borgeson et al. | |
| 6,992,026 B2 | 1/2006 | Fukuyo et al. | |
| 7,014,082 B2 | 3/2006 | Hauer et al. | |
| 7,211,526 B2 | 5/2007 | Iri et al. | |
| 7,217,448 B2 | 5/2007 | Koyo et al. | |
| 7,304,265 B2 | 12/2007 | Otsu et al. | |
| 7,371,431 B2 | 5/2008 | Dietz et al. | |
| 7,396,742 B2 | 7/2008 | Fukuyo et al. | |
| 7,528,342 B2 | 5/2009 | Deshi | |
| 7,626,137 B2 | 12/2009 | Fukuyo et al. | |
| 7,628,303 B2 | 12/2009 | Hoetzel | |
| 7,629,250 B2 | 12/2009 | Benson et al. | |
| 7,638,730 B2 | 12/2009 | Yoo et al. | |
| 7,642,483 B2 | 1/2010 | You et al. | |
| 7,723,212 B2 | 5/2010 | Yamamoto et al. | |
| 7,723,641 B2 | 5/2010 | Fujii | |
| 7,726,532 B2 | 6/2010 | Gonoe | |
| 7,772,522 B2 | 8/2010 | Matsumoto et al. | |
| 7,812,281 B2 | 10/2010 | Acker et al. | |
| 7,816,623 B2 | 10/2010 | Otsu et al. | |
| 7,820,941 B2 | 10/2010 | Brown et al. | |
| 7,977,602 B2 | 7/2011 | Birrell | |
| 8,011,207 B2 | 9/2011 | Abramov et al. | |
| 8,051,679 B2 | 11/2011 | Abramov et al. | |
| 8,053,704 B2 | 11/2011 | Abramov et al. | |
| 8,067,713 B2 | 11/2011 | Yue | |
| 8,071,960 B2 | 12/2011 | Hoeche | |
| 8,110,776 B2 | 2/2012 | Jung et al. | |
| RE43,400 E | 5/2012 | O'Brien et al. | |
| 8,171,753 B2 | 5/2012 | Abramov et al. | |
| 8,173,038 B2 | 5/2012 | Wagner | |
| 8,269,138 B2 | 9/2012 | Garner et al. | |
| 8,426,767 B2 | 4/2013 | Glaesemann et al. | |
| 8,551,865 B2 | 10/2013 | Fukuyo et al. | |
| 2002/0006765 A1 | 1/2002 | Michel et al. | |
| 2003/0217568 A1 | 11/2003 | Koyo et al. | |
| 2004/0060416 A1 | 4/2004 | Luiz | |
| 2004/0086688 A1 | 5/2004 | Hirano et al. | |
| 2004/0144231 A1 | 7/2004 | Hanada | |
| 2004/0169023 A1 | 9/2004 | Tanaka | |
| 2004/0251290 A1 | 12/2004 | Kondratenko | |
| 2005/0029321 A1 | 2/2005 | Hauer et al. | |
| 2005/0199592 A1 | 9/2005 | Iri et al. | |
| 2005/0221044 A1 | 10/2005 | Gaume et al. | |
| 2006/0021977 A1* | 2/2006 | Menegus | 219/121.69 |
| 2006/0081101 A1 | 4/2006 | Hayashi et al. | |
| 2006/0081571 A1 | 4/2006 | Hoebel et al. | |
| 2006/0101858 A1 | 5/2006 | Fujii | |
| 2006/0137505 A1 | 6/2006 | Wakayama | |
| 2007/0039932 A1 | 2/2007 | Haase et al. | |
| 2007/0051706 A1 | 3/2007 | Bovatsek et al. | |
| 2007/0062921 A1 | 3/2007 | Karube et al. | |
| 2007/0151962 A1* | 7/2007 | Doll et al. | 219/121.72 |
| 2007/0164072 A1 | 7/2007 | Nishio | |
| 2007/0170162 A1 | 7/2007 | Haupt et al. | |
| 2007/0178672 A1 | 8/2007 | Tanaka | |
| 2007/0228100 A1 | 10/2007 | Gonoe | |
| 2008/0000884 A1 | 1/2008 | Sugiura et al. | |
| 2008/0053972 A1 | 3/2008 | Otsu et al. | |
| 2008/0110952 A1 | 5/2008 | Kemmerer et al. | |
| 2008/0128953 A1 | 6/2008 | Nagai et al. | |
| 2008/0194079 A1 | 8/2008 | Yamamoto et al. | |
| 2008/0283509 A1 | 11/2008 | Abramov et al. | |
| 2008/0292844 A1 | 11/2008 | Sabia et al. | |
| 2008/0305615 A1 | 12/2008 | Ueno et al. | |
| 2009/0014492 A1 | 1/2009 | Haase | |
| 2009/0040640 A1 | 2/2009 | Kim et al. | |
| 2009/0126403 A1 | 5/2009 | Abramov et al. | |
| 2009/0159580 A1 | 6/2009 | Hsu et al. | |
| 2009/0220761 A1 | 9/2009 | Dejneka et al. | |
| 2009/0294419 A1 | 12/2009 | Abramov et al. | |
| 2009/0294420 A1 | 12/2009 | Abramov et al. | |
| 2010/0012633 A1 | 1/2010 | Atsumi et al. | |
| 2010/0078417 A1 | 4/2010 | Abramov et al. | |
| 2010/0089882 A1 | 4/2010 | Tamura | |
| 2010/0206008 A1 | 8/2010 | Harvey et al. | |
| 2010/0210442 A1 | 8/2010 | Abramov et al. | |
| 2010/0212361 A1 | 8/2010 | Abramov et al. | |
| 2010/0258993 A1 | 10/2010 | Zhou et al. | |
| 2010/0287991 A1 | 11/2010 | Brown et al. | |
| 2010/0294748 A1 | 11/2010 | Garner et al. | |
| 2011/0000897 A1 | 1/2011 | Nakano et al. | |
| 2011/0000898 A1 | 1/2011 | Rumsby | |
| 2011/0027971 A1 | 2/2011 | Fukuyo et al. | |
| 2011/0037149 A1 | 2/2011 | Fukuyo et al. | |
| 2011/0049765 A1 | 3/2011 | Li et al. | |
| 2011/0095062 A1 | 4/2011 | Maekawa | |
| 2011/0127244 A1 | 6/2011 | Li et al. | |
| 2011/0250423 A1 | 10/2011 | Fukasawa et al. | |
| 2012/0000894 A1 | 1/2012 | Abramov et al. | |
| 2012/0047956 A1 | 3/2012 | Li et al. | |
| 2012/0135847 A1 | 5/2012 | Fukasawa et al. | |
| 2013/0323469 A1 | 12/2013 | Abramov et al. | |

FOREIGN PATENT DOCUMENTS

| | | | |
|---|---|---|---|
| GB | 1222182 | 8/1971 | |
| JP | H04224091 | 8/1992 | |
| JP | 2000219528 A * | 8/2000 | C03B 33/09 |
| JP | 2001080928 A | 3/2001 | |
| JP | 2004010466 A | 1/2004 | |
| JP | 2004223796 | 8/2004 | |
| JP | 2005088078 | 4/2005 | |
| JP | 2005212473 A | 8/2005 | |
| JP | 2006159747 A | 6/2006 | |
| JP | 2008247038 | 10/2008 | |
| JP | 2009066851 A | 4/2009 | |
| JP | 2009280452 A | 12/2009 | |
| JP | 2010150068 A | 7/2010 | |
| WO | 02100620 A1 | 12/2002 | |
| WO | 03008352 A1 | 1/2003 | |
| WO | 2004014625 A1 | 2/2004 | |
| WO | 2007094348 A1 | 8/2007 | |
| WO | 2008/108332 A1 | 9/2008 | |
| WO | 2010138451 A1 | 12/2010 | |

OTHER PUBLICATIONS

Machine Translation of JP 2008-007360 Publication Date Jan. 17, 2008.

Machine Translation of JP 2008-007384 Publication Date Jan. 17, 2008.

(56) References Cited

OTHER PUBLICATIONS

Machine Translation of JP 2008-247732 Publication Date Oct. 16, 2008.
Machine Translation of JP 2004-083378 Publication Date Mar. 18, 2004.
Chinese Office Action & Search Report dated Dec. 10, 2013, relating to CN Patent Application No. 201080045044.6 filed Aug. 27, 2010.
Official Action issued in corresponding JP Appln. No. 2012-527001, mailed Apr. 1, 2014.
Chinese Office Action and Search Report issued in Corresponding CN Appln. No. 101080045044.6, mailed Dec. 10, 2013.
Karube, et al. "Laser-Induced Cleavage of LCD Glass as Full-Body Cutting"; Proceeding of SPIE, vol. 6880; pp. 688007-1 to 688007-10; 2008.
Yamamoto et al. "Three-Dimensional Thermal Stress Analysis on Laser Scribing of Glass"; Precision Engineering, 32 (2008) 301-308.
Yamamoto et al. "Thermal Stress Analysis on Laser Scribing of Glass", Journal of Laser Applications; vol. 20, No. 4, (2008), pp. 193-200.
Hamamatsu Photonics K.K. Electron Tube Division; "Stealth Dicing Technology and Applications", Mar. 2005.
Kumagai, Masayoshi, et al. "Advanced Dicing Technology for Semi-conductor Wafer—Stealth Dicing." Semiconductor Manufacturing, IEEE Transactions on 20.3 (2007): 259-265.
International Search Report relating to PCT/US2010/047238 filed Aug. 31, 2010; Mail Date: Nov. 30, 2010.
International Search Report relating to PCT/US2010/057932 filed Nov. 24, 2010; Mail Date: Mar. 15, 2011.
International Search Report relating to PCT/US2011/049637 filed Nov. 22, 2011; Mail Date: May 12, 2011.
International Search Report & Written Opinion relating to PCT/US2013/044208 filed Jun. 5, 2013; Mail Date: Sep. 18, 2013.
Chinese Office Action and Search Report Dated Aug. 6, 2014 relating to CN Patent Application No. 201080045044.6.

\* cited by examiner

METHODS FOR LASER CUTTING GLASS SUBSTRATES

CROSS-REFERENCE TO RELATED APPLICATIONS

This application claims the benefit of priority under 35 U.S.C. §119(e) of U.S. Provisional Application Ser. No. 61/237,728 filed on Aug. 28, 2009.

BACKGROUND

1. Field

The present specification generally relates to methods for cutting and separating glass substrates and, more specifically, to methods for laser cutting and separating strengthened glass substrates.

2. Technical Background

Thin strengthened glass substrates, such as chemically, thermally, or laminate strengthened substrates have found wide-spread application in consumer electronics because of their excellent strength and damage resistance. For example, such glass substrates may be used as cover sheets for LCD and LED displays and touch applications incorporated in mobile telephones, display devices such as televisions and computer monitors, and various other electronic devices. To reduce manufacturing costs it may be desirable that such glass substrates used in consumer electronics devices be formed by performing thin film patterning for multiple devices on a single large glass sheet, then sectioning or separating the large glass substrate into a plurality of smaller glass substrates using various cutting techniques.

The magnitude of compressive stress and the elastic energy stored within the central tension region may make cutting and finishing of chemically strengthened glass substrates difficult. The high surface compression and deep compression layers make it difficult to mechanically scribe the glass substrate as in traditional scribe-and-bend processes. Furthermore, if the stored elastic energy in the central tension region is sufficiently high, the glass may break in an explosive manner when the surface compression layer is penetrated. In other instances, the release of the elastic energy may cause the break to deviate from a desired involve cutting and finishing the non-chemically strengthened glass to shape before the strengthening process.

Accordingly, a need exists for alternative methods for cutting strengthened glass substrates.

SUMMARY

In one embodiment, a method for cutting a glass article from a strengthened glass substrate having a surface compression layer and a tensile layer includes forming an edge defect in the surface compression layer on a first edge of the strengthened glass substrate and propagating a through vent through the surface compression and tensile layers at the edge defect. The through vent precedes a region of separation along a cut line between the glass article and the strengthened glass substrate.

In another embodiment, a method of cutting a glass article from a strengthened glass substrate having a surface compression layer and a tensile layer includes scanning a laser beam incident on the surface compression layer and along the length of a cut line between the glass article and the strengthened glass substrate such that a through vent propagates along the cut line.

In yet another embodiment, a method of cutting a strengthened glass substrate having a surface compression layer and a tensile layer includes forming a defect on the surface compression layer of the glass substrate along a cut line. The method further includes scanning a laser beam along the length of the cut line to separate the strengthened glass substrate along the cut line.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION OF THE PREFERRED EMBODIMENTS

Figure 1:
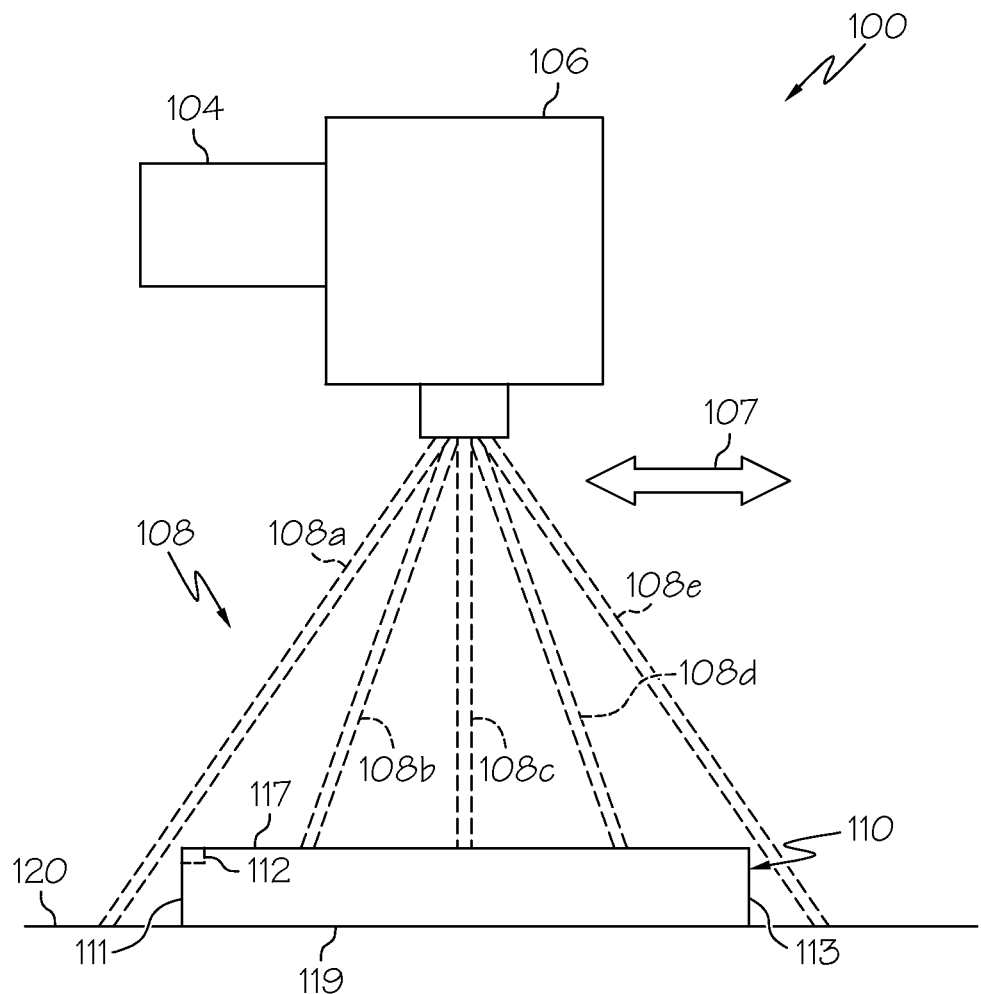
FIG. 1 schematically depicts a side view of a strengthened glass substrate and a laser system according to one or more embodiments.

Reference will now be made in detail to various embodiments for cutting strengthened glass substrates, examples of which are illustrated in the accompanying drawings. Whenever possible, the same reference numerals will be used throughout the drawings to refer to the same or like parts. As described herein, methods for cutting glass articles from strengthened glass substrates generally comprise forming a defect on the strengthened glass substrate. The defect is positioned on a cut line that defines a region of separation. A laser beam is rapidly scanned along the entire length of the cut line and over the edge defect to initiate a through vent at the edge defect. The through vent travels completely through the glass substrate (i.e., between the top and bottom layers). The laser beam may be continuously scanned along the length of the cut line such that the through vent quickly propagates through the glass substrate along the scanned laser line to cut the glass article from the glass substrate. Various embodiments of the methods for cutting glass articles will be described in more detail herein below.

Figure 2:
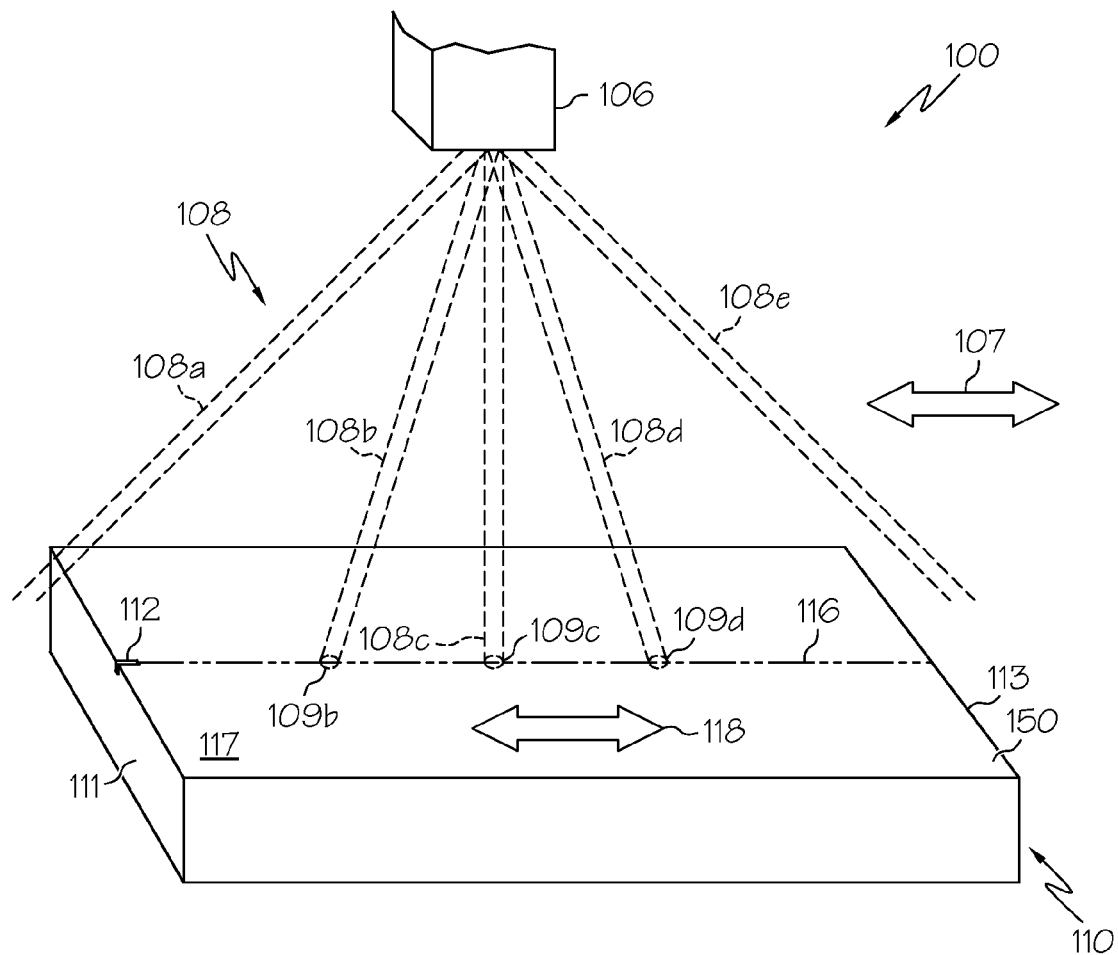
FIG. 2 schematically depicts a perspective view of the strengthened glass substrate and the laser system schematically depicted in FIG. 1 according to one or more embodiments.

Referring to FIGS. 1 and 2, an exemplary system 100 for cutting a glass article 150 from a glass substrate 110 by way of a through vent 140 (see FIGS. 4A and 4B) extending fully through the thickness of the glass substrate 110 is schematically depicted. The exemplary system 100 generally comprises a laser source 104 and a laser scanner 106 for heating a glass substrate 110 positioned on a support surface 120 along a cut line 116 (i.e., a region of separation) of the glass substrate 110.

In the embodiments described herein, the glass substrate 110 may have a first surface 117, a second surface 119, a first edge 111, and a second edge 113. The glass substrate 110 may be formed from various glass compositions including, without limitation, borosilicate glasses or aluminosilicate glass. The glass substrates cut by embodiments of the methods described herein may be strengthened by a strengthening process, such as an ion exchange chemical strengthening process, thermal tempering, or layered glass structures such as CORELLE® ware. It should be understood that although embodiments herein are described in the context of chemically strengthened glass substrates, other types of strengthened glass substrates may be cut by the methods described herein.

Figure 9:
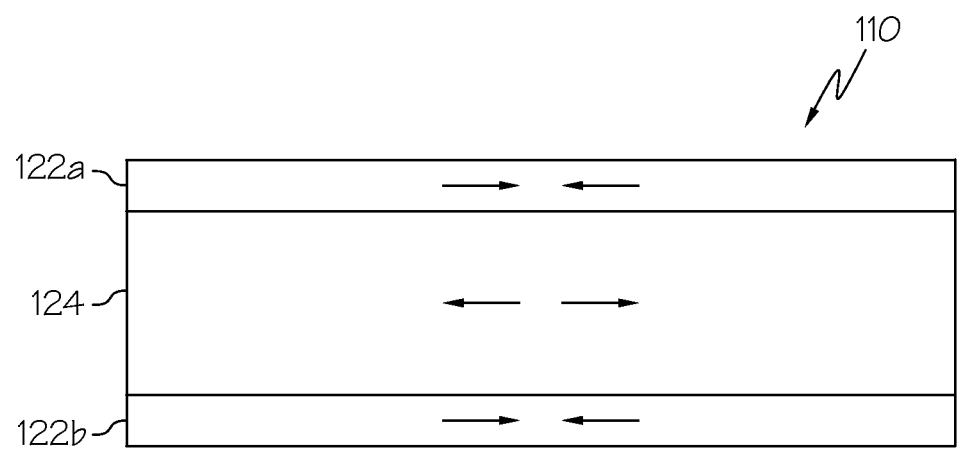
FIG. 9 schematically depicts compressive layers and an inner tensile region of a strengthened glass substrate.

FIG. 9 schematically illustrates a glass substrate 110 chemically strengthened by a strengthening process, such as an ion exchange strengthening process, for example. The glass substrate 110 comprises two surface compression layers 122a and 122b and an inner tensile layer 124. The surface compression layers 122a and 122b are kept in a compressive stress state that provides the glass substrate 110 its strength. The inner tensile layer 124 is under tensile stress to compensate for the compressive stresses in the surface compression layers 122a and 122b such that the forces balance each other and the glass substrate does not fracture.

The damage resistance of chemically strengthened glass substrates is a result of the surface compression layers 122a and 122b formed on the glass substrate 110 during the strengthening process, such as an ion exchange strengthening process, often referred to as "chemical strengthening" or "chemical tempering." The chemical strengthening process involves exchanging ions within a surface layer of the glass substrate with ions of a different size at a temperature such that the glass substrate develops a surface compressive stress at use temperature. The magnitude of the compressive stress and the depth of the surface compression layer that can be achieved by the ion exchange process are dependent on glass composition. As an example, surface compressions of greater than 750 MPa and compressive layer depths greater than 40 µm may be present in chemically strengthened GORILLA® glass. By comparison, surface compressions of less than 750 MPa and compressive layer depths of less than 15 µm an may be present in chemically strengthened soda-lime glass substrates.

In an example of a chemical strengthening process, the glass substrate may be subjected to an ion exchange strengthening process that comprises submersing a glass substrate in a molten salt bath held at a temperature below the strain point of the glass for a length of time sufficient to diffuse ions into the surface of the glass to the desired depth to achieve the desired stress profile. The ion exchange strengthening process results in a strengthened glass substrate 110 having increased compressive stress on the glass surfaces and increased tensile stress in the interior region of the glass. The glass substrates may have a coefficient of thermal expansion (CTE) of greater than $30 \times 10^{-7}/°$ C., for example.

The laser source 104 and the laser scanner 106 may be controlled by a system controller (not shown), which may be a computer. The laser source 104 may comprise a laser having a suitable wavelength for transferring photon energy onto the glass substrate 110. For example, the laser source 104 may be configured to emit a laser beam 108 having a wavelength in the infrared range. A laser wavelength should be selected such that absorption is present in the glass substrate. In the case of low absorption, either a high power laser or a multiple path absorption technique may be used such that glass substrate is heated to a temperature which enables the laser separation process. In the embodiments described herein, the laser source is a $CO_2$ laser which produces a beam of infrared light having a wavelength from about 9.4 µm to about 10.6 µm. The $CO_2$ laser source may be a DC current laser source operated in a continuous wave mode. The $CO_2$ laser may also operate in a pulsed mode, such an RF-excited laser source providing pulsed radiation within a range of about 5 kHz to about 200 kHz. The power at which the laser source 104 is operated during the scanning and cutting operation depends on the thickness as well as the surface area of the glass substrate 110. Greater thickness and/or surface area of the glass substrate 110 may require greater laser power for the cutting operation. Generally, the laser source 104 of the embodiments described herein may be operated at a continuous wave power within the range of several tens of watts to several hundreds or thousands watts. As described in detail below, some embodiments utilize a water jet in conjunction with the laser source 104. In embodiments utilizing a water jet, the power of the laser source 104 may be lowered.

The laser source 104 may be operated at a power and the laser beam focused at a focal length such that overheating and laser ablation on the first surface 117 of the glass substrate 110 is avoided. A beam expander (not shown) and one or more focusing lenses (not shown) may be utilized in the system 100 to achieve a desired laser beam size and focal length. In one embodiment, the diameter of the laser beam 108 may be 10 mm and may be focused down to 1 mm in diameter on the first surface 117.

The laser scanner 106, such as a polygonal scanning mirror or a scanning galvonometer mirror, may be positioned in the optical pathway following the laser source 104. The laser scanner 106 may be configured to rapidly scan the laser beam 108 uni-directionally or bi-directionally along an entire length of the cut line 116 in the direction as indicated by arrow 107 with a galvonometer. Or, in another embodiment, the laser beam 108 may be continuous scanned uni-directionally with a polygonal mirror. In one embodiment, the laser scanner 106 is operable to scan the laser beam 108 at a speed of about 1 m/s. The rapidly scanned laser beam 108 is illustrated in FIGS. 1 and 2 as a plurality of laser beams 108a-108e to depict the laser beam 108 being scanned across the glass substrate 110. The laser beam 108 generates a circular beam spot (e.g., 109b-109d) on the first surface 117 of the glass substrate 110 along the cut line 116. The beam spots 109a-109d travel back and forth along the cut line as indicated by arrow 118. As described later herein, the change in temperature of the glass substrate 110 due to the heating provided by a scanned laser beam causes tensile stresses to develop along the cut line 116, thereby forming a through vent 140 (see FIGS. 4A and 4B) which extends fully through the thickness of the glass substrate 110 (i.e., a "full body" cut) and propagates along the cut line 116 in a controlled manner.

Figure 3:
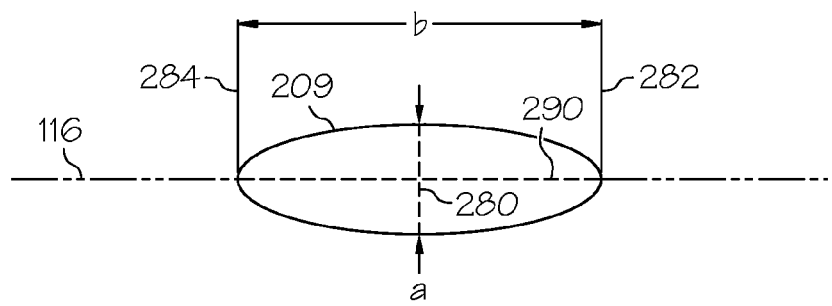
FIG. 3 schematically depicts an elliptical laser beam spot traveling along a cut line according to one or more embodiments.

In one embodiment, the beam spot may be an elliptical laser beam spot 209 as illustrated in FIG. 3. The elliptical beam spot 209 may confine the regions of heating more narrowly along the cut line 116. As such overheating or ablation may be avoided due to lowered laser power density. The elliptical beam spot 209 may generally have a minor axis 280 of length a and a major axis 290 of length b. The minor axis 280 extends across the midpoint of the elliptical laser beam spot as shown in FIG. 3. The major axis 290 may generally be the length b of the elliptical beam spot 209 between the leading edge 282 and the trailing edge 284 of the elliptical beam spot 209, as shown in FIG. 3. Cylindrical lens and/or other optical elements may be used to shape the laser beam 108 such that the elliptical beam spot 209 is produced on the first surface. The cylindrical lens and/or other optical elements used for shaping the laser beam to form an elliptical beam spot may be integral with the laser source 104 or laser scanner 106, or may be separate components, for example.

Referring to FIGS. 1 and 2, a method of cutting a glass article 150 from a glass substrate 110 by propagating a through vent according to one embodiment may include first introducing an defect 112 on a first surface 117 at an edge 111 of the glass substrate 110 to form a vent initiation point. The defect may be located on an edge (i.e., an edge defect), or some distance away from the edge, or in the bulk of the glass substrate 110. In some of the embodiments described hereafter the defect is formed on an edge of the chemically strengthened glass substrate.

The edge defect 112 may be a small score at the edge or on the edge face of the glass substrate 110. The edge defect 112 may generally be positioned on the first surface 117 of the glass substrate 110 such that the edge defect 112 lies along a cut line 116 along which the glass substrate 110 may be subsequently separated (i.e., a region of separation). The edge defect 112 may be formed mechanically, such as with a mechanical scribe, a mechanical grinder wheel, or by laser ablation or laser induced damage within the bulk of the glass substrate.

After the edge defect 112 is formed, a laser beam 108 from the laser source 104 may be directed and scanned onto the first surface 117 of the glass substrate 110 by the laser scanner 106 such that the scanned laser beam 108 forms a scanned laser line that is incident on the cut line 116. The laser beam 108 may be scanned at a speed of greater than 0.5 m/s, for example, in the direction indicated by arrow 107. The speed of the scanned laser beam 108 may depend on the thickness, surface area and strength of the glass substrate 110. The scanned laser beam as depicted by laser beams 108a-108e form a plurality of beam spots 109b-109d that define the scanned laser line. It will be understood that laser beams 108a-108e and beam spots 109b-109d are only for illustrative purposes, and are used to represent that the laser beam 108 is rapidly scanned across the first surface 117 of the glass substrate 110. As described in more detail below, the scanned laser line incident on the cut line 116 acts as a guide for the propagating through vent. To ensure that the through vent is properly guided, the laser scanner 106 should be operated such that the length of the scanned laser line is equal to or greater than the length of the glass substrate 110 or the cut line 116. If the scanned laser line is less than the length of the glass substrate 110, the through vent may deviate from the cut line and produce a glass article having an erroneous edge.

The scanned laser beam 108 may be operated at a power level to heat the glass substrate 110 along the cut line, including heating at the edge defect 112. The glass substrate 110 has a relatively strong absorption at the infrared laser source, which may be a $CO_2$ laser operated at a wavelength of about 10.6 µm, for example. A $CO_2$ laser acts like a surface heater to rapidly heat the surface of the glass material. However, rapid scanning of the laser beam 108 by the laser scanner 106 enables the generated heat to diffuse through the bulk of the glass substrate 110 while avoiding overheating and stress relaxation at the first surface 117, which is under compressive stress.

Figure 4A:
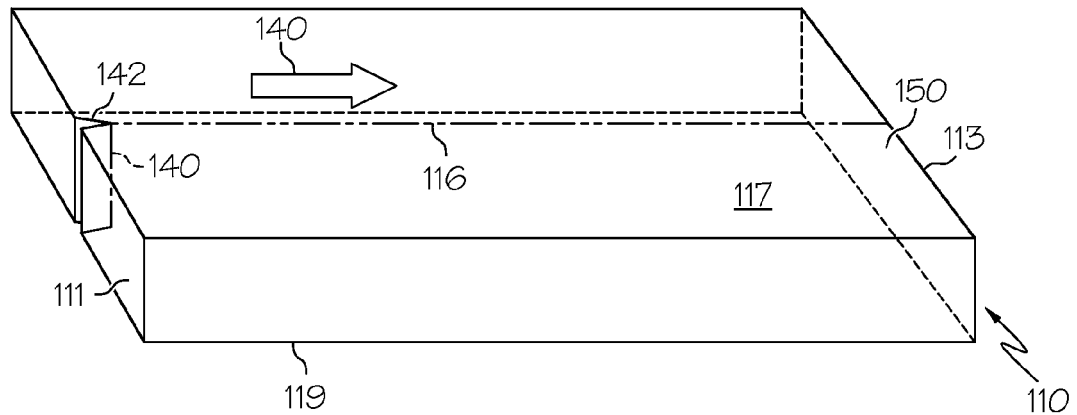
FIG. 4A schematically depicts an initiation of a through vent at an edge defect positioned on a strengthened glass substrate according to one or more embodiments.

Referring to FIGS. 1, 2, 4A and 4B, heating on the edge defect 112 by the scanned laser beam 108 opens up a through vent 140 at location 142, which is at or proximate the edge defect 112. The phrase "through vent" as used herein means a vent that extends from a first surface 117 (e.g., a top surface) through to a second surface 119 (e.g., a bottom surface). Referring to FIG. 4A, a through vent 140 is illustrated at location 142. The through vent 140 opens at the edge defect 112 as a result of the heat provided by the scanned laser beam 108. The through vent 140 is depicted in FIG. 4A as having an exaggerated size/shape to illustrate how the through vent 140 opens at location 142. For example, the through vent 140 may be a small crack starting at the edge defect 112.

Figure 4B:
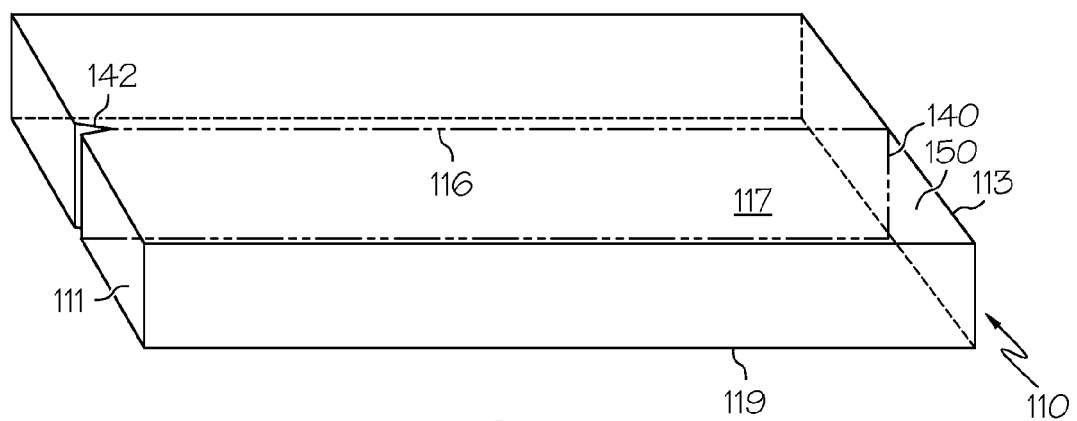
FIG. 4B schematically depicts a through vent that has propagated from an edge defect to an opposite edge of a strengthened glass substrate according to one or more embodiments.

As illustrated in FIG. 4A, the through vent 140 begins to propagate through the glass substrate 110 along the cut line 116. The through vent 140 precedes a region of separation along the cut line 116 that separates the glass article 150 from the glass substrate 110. FIG. 4B depicts a through vent 140 having been propagated from the edge defect 112 at edge 111 through the glass substrate to second edge 113 along straight cut line 116, thereby separating the glass article 150 from the glass substrate 110. The through vent 140 accelerates in a direction of least resistance, which is provided by the scanned laser line along the cut line 116. In one embodiment, the through vent 140 rapidly propagates through the glass substrate 110 along the cut line 116 at a propagation speed of about 1.3 km/s. The scanned laser beam 108 produces a tensile stress field within the bulk of the glass substrate 110 that is perpendicular to the direction of the scanned laser line (i.e., the cut line 116). The fast through vent propagation is a result of the net tensile stress which is perpendicular to the scanned laser line. The tensile stress is created by the superposition of intrinsic and transient stress fields. In the case of strengthened glass substrates, the intrinsic stress field, which is compressive-tensile-compressive across the glass thickness, is produced during the strengthening or glazing process. The transient stress, which may be tensile-compressive-tensile, is produced by the laser heating along the scanned laser line. The net tensile stress in the region of separation enables the through vent to propagate in the direction of the scanned laser line. The net tensile stress is highest in the bulk of the glass sheet. The crack front may propagate inside the bulk of the glass initially, followed by a breakthrough of the glass compressive layers at the surface.

As an example and not a limitation, a glass substrate 110 comprising a 100×150×0.95 mm thick glass sheet that was chemically strengthened by an ion exchange strengthening process was cut by the method described above. The glass sheet was submerged in a molten bath of 100% $KNO_3$ at 410° C. for eight hours. The ion exchange strengthening process yielded a chemically strengthened glass sheet having surface compressive layers having a compressive stress of about 769 MPa at a depth of about 51 μm and a calculated center tension region of about 46 MPa. The center tension (CT) was calculated using the formula:

$$CT = \frac{CS \times DOL}{t - 2*DOL}, \quad (1);$$

where CS is the surface compressive stress, DOL is the depth of the compressive layer, and t is the glass substrate thickness.

An edge defect was introduced at an edge of a top surface of the glass sheet by scoring the glass sheet with a carbide tip. A laser source was operated to emit a laser beam having a wavelength of about 10.6 μm at a power of about 80 W and a beam diameter of 1 mm that was defocused on the glass surface. A laser scanner rapidly scanned a laser beam back and forth over a straight cut line at a speed of about 1 m/s to produce a scanned laser line. The scanned laser line was about 125 mm and therefore longer than the glass substrate. After approximately a second of scanning the laser beam, a through vent was initiated at the edge defect and rapidly propagated through the glass sheet, thereby separating the glass sheet along the cut line.

Figure 5A:
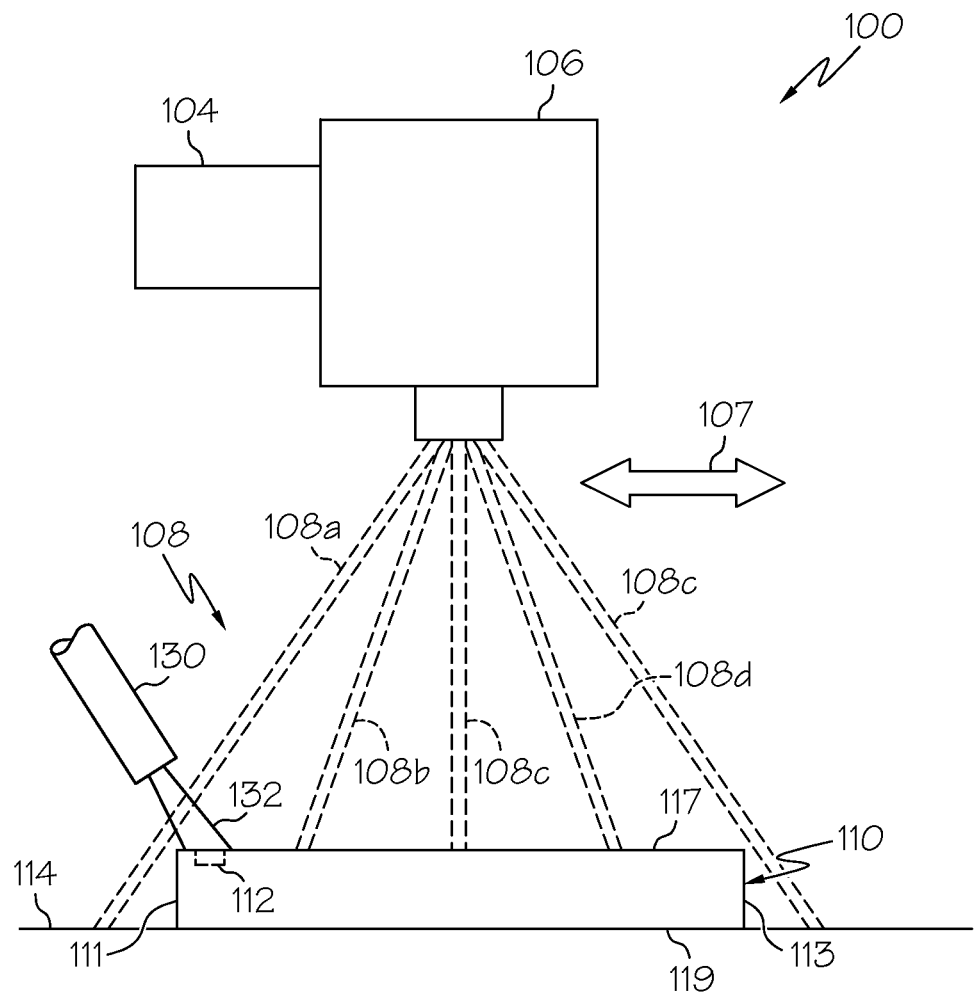
FIG. 5A schematically depicts a side view of a strengthened glass substrate, a laser system and a water jet apparatus according to one or more embodiments.
Figure 5B:
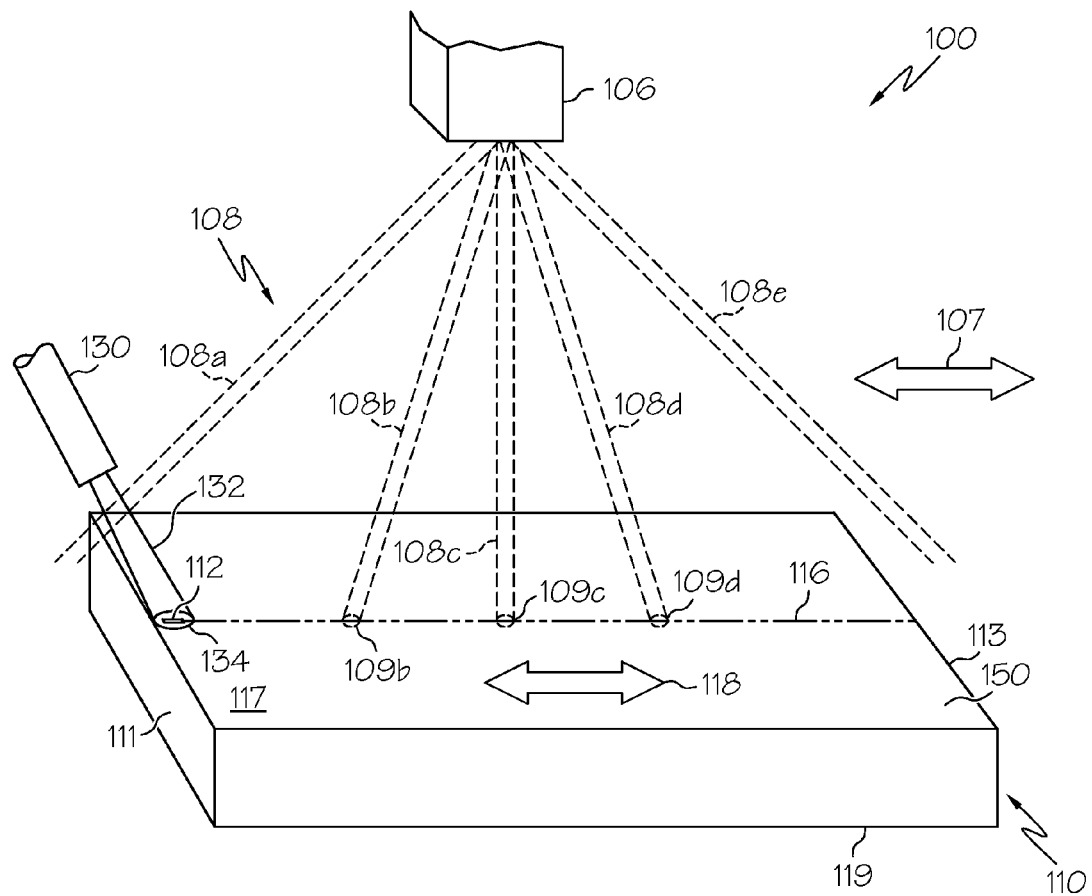
FIG. 5B schematically depicts a perspective view of the strengthened glass substrate, laser system and water jet apparatus schematically depicted in FIG. 5A according to one or more embodiments.

Another embodiment of the method of cutting a glass article 150 from a glass substrate 110 by propagating a through vent is illustrated in FIGS. 5A and 5B. The system 100 of this embodiment is similar the embodiment illustrated in FIGS. 1A and 1B, except the system now includes a water jet nozzle 130 for directing a water jet 132 toward the heated glass substrate 110 at a defect 112. In this embodiment, the defect 112 is positioned off of the edge 111 on the top surface 117 of the glass substrate 110. For example, the defect may be about 5 mm from the edge 111. The defect may also be positioned at an edge of the glass substrate in other embodiments that utilize a water jet. The water jet 132 quenches the defect 112 resulting in a change in temperature of the glass substrate 110 at the defect 112. This change in temperature causes tensile stresses to develop on the defect 112, thereby forming a through vent 140 (see FIGS. 4A and 4B) at the defect 112 which extends fully through the thickness of the glass substrate 110.

The water jet may generally comprise a flow of pressurized fluid emitted from a water jet nozzle and directed onto the surface of the glass substrate. The pressurized fluid may comprise water. Although water is one type of coolant that may used to cool the defect, other liquids such as liquid nitrogen, ethanol may be utilized. Alternatively, the water jet may comprise a compressed gas such as, for example, compressed air, compressed nitrogen, compressed helium or a similar compressed gas. The water jet may also comprise a mixture of liquid and compressed gas. For example, in some embodiments, the water jet is a mixture of compressed air and water.

The water jet 132 may be emitted from an orifice (not shown) in the end of the water jet nozzle 130. In one embodiment, the orifice is a 75 μm orifice provide a flow rate of 3 ccm. Referring to FIG. 5B, as the water jet 132 travels towards the first surface 117 of the glass substrate 110, the edges of the water jet 132 diverge from the center of the water jet nozzle 130 such that the water spot 134 where the water jet 132 is incident on the first surface 117 of the glass substrate 110 has a diameter $D_j$ larger than the orifice in the water jet nozzle 130. The water jet nozzle 130 may be positioned behind the laser source 104 with respect to the scanning direction 107. In the embodiments described herein, the water jet nozzle 130 may be oriented at an angle with respect to the first surface 117 of the glass substrate 110 such that the water jet 132 is incident on the surface of the glass substrate at an angle which is less than 90 degrees relative to the first surface 117 of the glass substrate 110.

As described above with reference to FIGS. 1 and 2, a laser beam 108 is rapidly scanned back forth on a first surface 117 of a glass substrate 110 along a cut line 116 in the directions indicated by arrow 107. The scanned laser beam 108 is also represented by laser beams 108a-108e. The scanned laser beam 108 generates a plurality of beam spots 109b-109d on along the cut line 116 in a direction indicated by arrow 118. The beam spots 109b-109d form a scanned laser line along the cut line 116. This scanned laser line heats the glass substrate 110 along the cut line 116.

The water jet 132 may be applied to the defect 112 while the scanned laser beam is heating the glass substrate 110 along the cut line. Alternatively, the laser scanner 106 may first scan the laser beam 108 along the cut line 116 for a period of time (e.g., one second). The laser source 104 may then cease emitting the laser beam 108 at which time the water jet nozzle 130 initiates the flow of the water jet 132 at the defect 112. This may enable the defect 112 to reach a maximum temperature prior to being cooled by the application of the water jet 132 and initiate the through vent.

Applying a water jet 132 at the defect 112 may enable the reduction of laser power needed to initiate the through vent 140 at the defect 112. For example, in some embodiments, the laser beam power needed to initiate a through vent 140 when using a water jet 132 may be approximately 20% less than the laser beam power needed when not using a water jet 132. Referring to the example provided above regarding the embodiment illustrated in FIGS. 1 and 2, a laser beam having a power of about 65 W was used to cut a similarly prepared ion exchanged glass sheet in a straight cut line.

Figure 6:
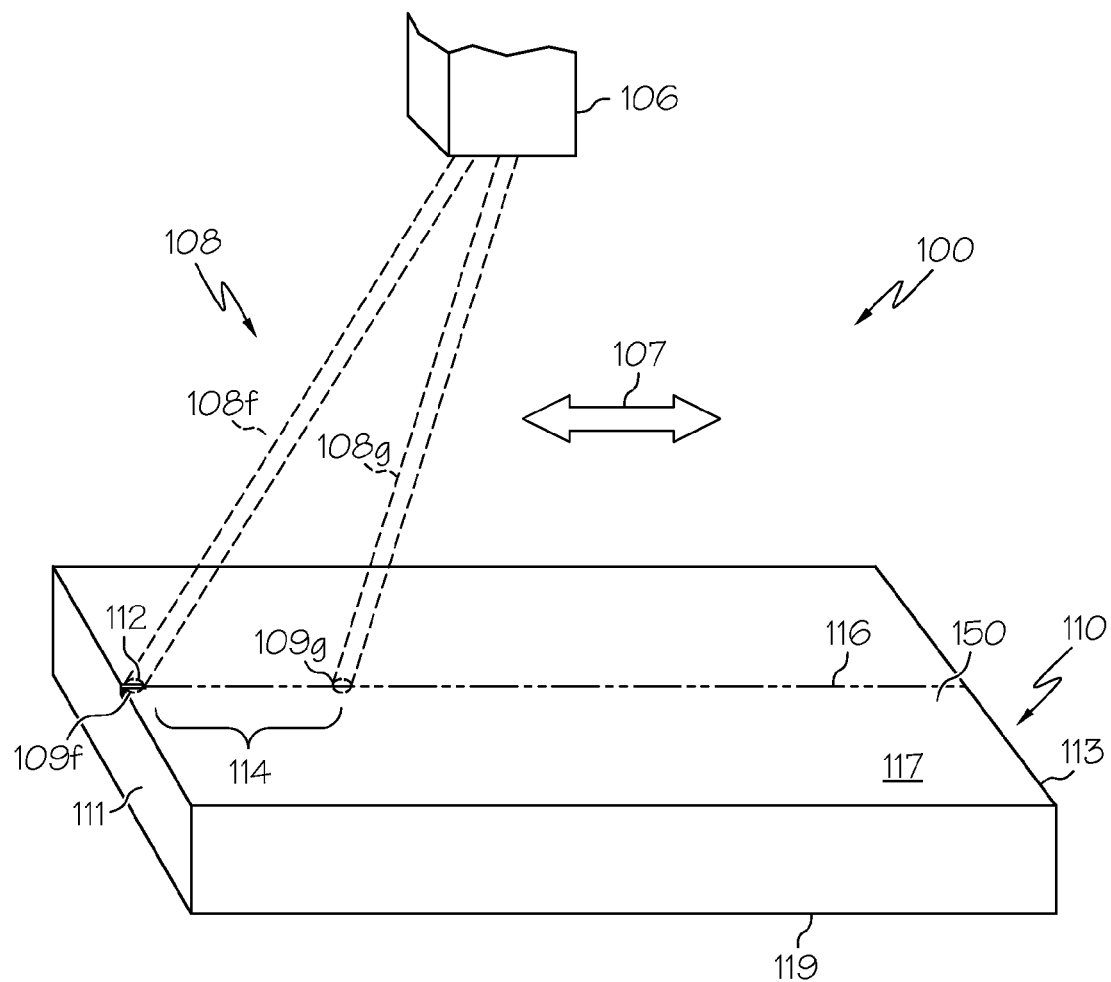
FIG. 6 schematically depicts a perspective view of a strengthened glass substrate and laser system in which the laser system performs a short scan about an edge defect according to one or more embodiments.

Referring now to FIGS. 1, 2 and 6, another embodiment of the method of cutting a glass article 150 from a glass substrate 110 by propagating a through vent is illustrated. In this embodiment, a laser beam 108 is rapidly scanned uni- or bi-directionally across a first surface 117 of the glass substrate 110 along an entire length of the cut line 116 for a period of time (e.g., half of one second) as described above. After the full length scan, the laser scanner 106 is controlled to rapidly scan the laser beam 108 along a shortened scan line 114 in a direction indicated by arrow 107. The shortened scan line 114 covers the edge defect 112 and overlaps with cut line 116. The scanning speed of the laser beam 108 during the generation of the shortened scan line 114 may be similar to the scanning speed of the laser beam 108 during the generation of the full scan line across the cut line 116 (e.g., about 1 m/s). Laser beams 108f and 108g depict the scanned laser beam 108 being scanned over the shortened scan line 114. Beam spots generated by the scanned laser beam 108 (e.g., beam spots 109f and 109g) define the shortened scan line 114. The shortened scan line may be of a length to produce localized heating at the edge defect 112 to initiate the generation of the through vent 140. In one embodiment, the length of the shortened scan line 114 may be about 10 mm, for example.

The localized heating of the shortened scan line 114 creates additional tensile stresses at the edge defect 112, thereby opening the through vent 140. As the region of separation was previously heated during the application of the full scanned laser line, the through vent 140 propagates along the cut line 116, which provides the path of least resistance for the through vent 140 to propagate.

The methods described herein may also be used to cut glass substrates coated with a thin (e.g., less than 0.5 mm) polymeric material, or glass substrates having at least one surface roughened by, for example, a chemical etching process. Where the glass substrate is coated on one surface, mechanical defects may be introduced on the uncoated surface while the laser is scanned over the coated surface to cut the coated glass substrate in one step. Where the glass substrate has at least one roughened surface, the laser may be scanned over non-roughened surface, if such a surface is available. The cutting of glass substrates from the roughened side by laser scanning may require higher laser power due to scattering loss from the surface.

It is also noted that the reflection (Fresnel) loss of the scanned laser beam 108 at the surface of the glass surface may also be considered and compensated for. The reflection loss may increase with the increasing incidence angle as the laser beam is scanned on the surface of the glass substrate 110 (the incidence angle at normal incidence is 0°). The reflection loss can be compensated by corresponding changes in the laser beam scanning speed (e.g., speed profiling, or variable speed scanning). For example and referring to FIG. 1, the laser scanner 106 may be controlled such that the scanned laser beam 108 is scanned along the cut line at a reference scanning speed when the incidence angle of the scanned laser beam is at normal incidence (beam 108c). As the angle of incidence of the scanned laser beam increases as the scanned laser beam 108 is scanned along the cut line 116, the laser scanner 106 may be controlled to correspondingly slow down the scanning speed of the scanned laser beam 108 to compensate for reflection loss (e.g., beams 108a and 108e). By slowing down the scanning speed of the scanned laser beam, the beam will provide increased radiant thermal heating to compensate for any reflection loss due to the increased angle of incidence.

Figure 7A:
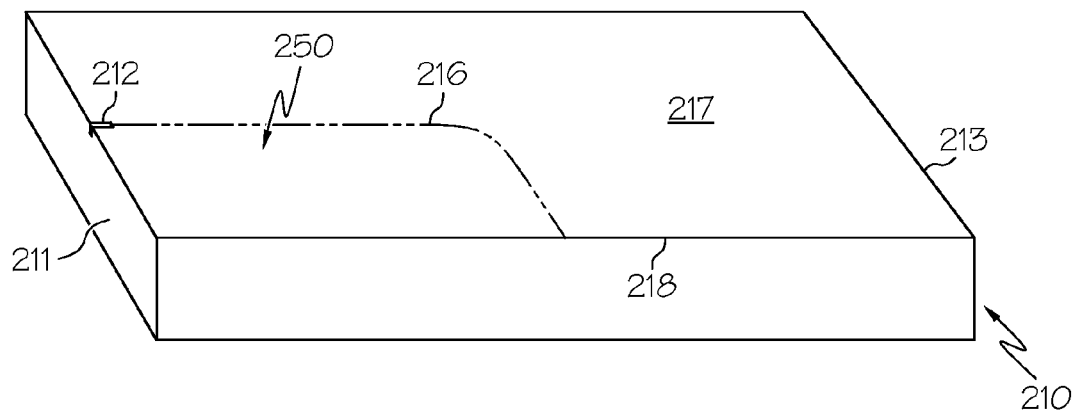
FIG. 7A schematically depicts a strengthened glass substrate having a curved cut line according to one or more embodiments.
Figure 7B:
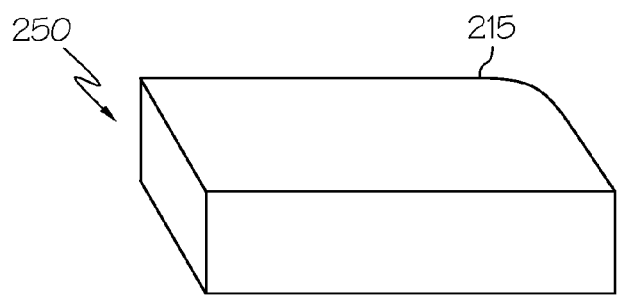
FIG. 7B schematically depicts a glass article having a curved edge after being cut from the strengthened glass substrate illustrated in FIG. 7A in accordance with one or more embodiments.

Embodiments disclosed herein may also be utilized to cut glass articles having curved edges from a chemically strengthened glass substrate. FIGS. 7A and 7B illustrate a glass substrate 210 in which a glass article 250 having a curved edge 215 is to be separated. The exemplary separated glass article 250 has a curved edge 215 as illustrated in FIG. 7B. To cut the glass article 250 from the glass substrate 210, an edge defect 212 is first formed on a first edge 211 of a first surface 217. As described above, the edge defect 212 may be applied mechanically or by laser ablation.

Referring to FIG. 7A, a curved cut line 216 defines a curved region of separation. In this example, the curved cut line 216 begins at a first edge 211 and ends at a second edge 218. A cut line may also comprise two curves such that the cut line begins and terminates at a single edge (e.g., first edge 211). A laser beam, such as the laser beam illustrated in FIGS. 1 and 2, is scanned over the curved cut line 216. The curved scanned laser line may be longer than the curved cut line 216 to ensure that the generated through vent does not deviate from the curved cut line 216 during propagation. The curved portion of the curved scanned laser line may comprise a plurality of small straight portions having approximately 90° turns therebetween. In this manner, a curved portion of the curved scanned laser line may be generated.

As the laser beam is scanned along the curved scanned laser line, a through vent is opened as described above (see FIGS. 4A and 4B). When performing a curved cut, a water jet or a shortened scan line as described above may also be utilized to initiate the generation of the through vent 140. The through vent 140 then rapidly propagates along the curved cut line 216, thereby separating the glass article 250 having a curved edge 215 from the glass substrate 210.

As an example and not a limitation, a glass substrate comprising a 100×150×0.95 mm thick glass sheet that was chemically strengthened by the ion exchange strengthening process described above was cut by a curved scanned laser line as described above. The prepared glass sheet had substantially the same stress profile of the glass sheet described in the previous example above. The cut line included a curved portion having a radius of curvature of about 10 mm. An edge defect was created on a first edge of the glass sheet by forming a score with a carbide tip. A laser beam having a laser power of about 90 W was rapidly scanned at approximately 1 m/s over the curved cut line. The curved portion of the scanned laser line comprised a plurality of straight portions and approximately 90° turns therebetween. A through vent was started at the edge defect and propagated along the curved cut line.

The methods described herein may also be utilized to cut glass articles having various shapes from a chemically strengthened glass substrate. The various shapes may comprise one or more curved edges. In one embodiment, a laser beam may be scanned along the perimeter of the shaped part as described above to achieve shape cutting. For shapes having a relatively long perimeter, the power of the laser may need to be increased to ensure that the cut line is properly heated prior to the initiation and propagation of the through vent (e.g., a laser power greater than 100 W). In another embodiment, a glass article having a curved or arbitrary shape may be separated from the chemically strengthened glass substrate in two cutting steps. In a first step, a glass article having curved or arbitrary edges is first separated from the glass substrate in a smaller rectangular sheet using the methods described above. In a second step, a laser beam is scanned over the curved or shaped portions of the glass article to obtain the desired shape. This embodiment may require less laser power as the separation of the smaller rectangular shape creates a smaller surface area in which the laser power may be distributed.

An exemplary embodiment of a shaped cutting method is described below. Two glass substrates 110 comprising of two 60×100×0.55 mm thick glass sheets were chemically strengthened by an ion exchange process. The glass substrates had a CTE of $91 \times 10^{-7}/°$ C. One of the glass sheets was ion exchanged to achieve a compressive stress of 780 MPa and a depth of layer (DOL) of 7 μm, with a calculated center tension of 10 MPa. The other glass sheet was ion exchanged to a compressive stress of 780 MPa and a DOL of 30 μm, with a calculated center tension of 48 MPa. An RF $CO_2$ laser source was operated at 20 kHz to emit a laser beam having a wavelength of about 10.6 μm. The laser beam was operated at 85 W, had a diameter of 1 mm, and was defocused on each glass surface. A laser scanner rapidly scanned a laser beam uni-directionally over a rectangular pattern having curved corners (each corner had a radius of 10 mm) at a speed of about 1.5 m/s. The scanned laser beam overlapped an edge defect generated with a carbide tip. After approximately 1 to 2 seconds of repetitive scans, two 40×80 mm rectangular parts with rounded corners were produced.

Because of very fast through vent propagation (e.g., 1.3 km/s), embodiments described herein may be attractive for use in high volume manufacturing facilities. Traditional methods of cutting chemically strengthened glass are slow as the glass articles are either first separated from a larger non-chemically strengthened glass substrate and then chemically strengthened, or are cut by a slow and cumbersome scribe-and-break process. Furthermore, very thin glass substrates (e.g., less than 1 mm in thickness) may easily break during a scribe-and-break process which may create a large amount of wasted materials.

Figure 8:
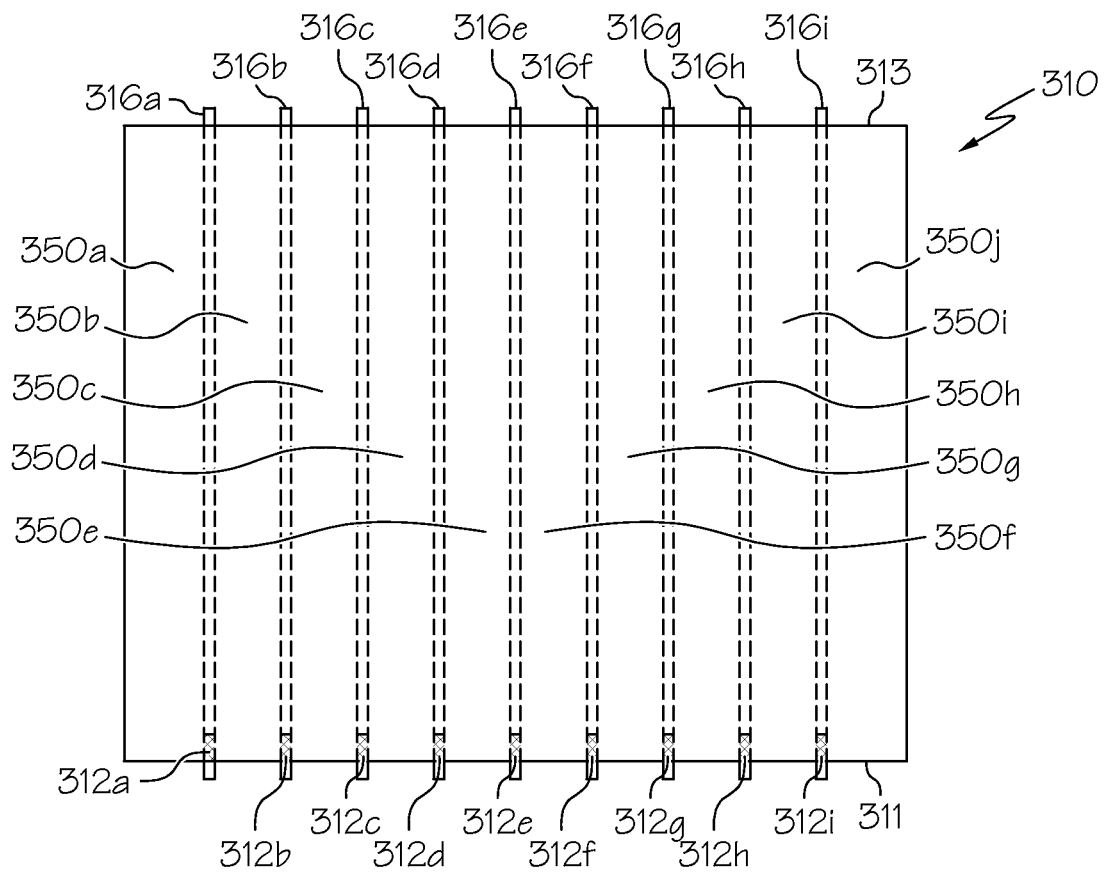
FIG. 8 schematically depicts a strengthened glass substrate having a plurality of edge defects and a plurality of scanned laser lines for cutting a plurality of articles from the strengthened glass substrate according to one or more embodiments.

FIG. 8 illustrates a large chemically strengthened glass substrate 310 that may be cut into a plurality of rectangular strips 350a-350j by using the methods described herein. Edge defects 312a-312i may be formed along an edge 311 of the glass substrate 310. A single laser source may be operated to sequentially scan a laser beam back and forth on a cut line started at the edge defect (e.g., edge defect 312a) to create a scanned laser line (e.g., scanned laser line 316a) that is longer than the length of the glass substrate 310. The laser beam may be scanned until the rectangular strip (e.g., rectangular strip 350a) is separated from the glass substrate 310. The operation may be sequentially repeated until each rectangular strip 350a-350j is cut. In another embodiment, multiple laser sources may be used to cut the rectangular strips 350a-350j from the glass substrate. After the rectangular strips 350a-350j have been separated, further laser cutting may be performed to achieve a desired shape of the glass article. In this manner, fast and efficient high-volume cutting of glass articles from a chemically treated glass substrate may be realized.

As an example and not a limitation, a glass substrate 110 comprising a 225×300×0.975 mm thick glass sheet that was chemically strengthened by an ion exchange strengthening process was cut by the method described above. The glass ion exchange strengthening process yielded a chemically strengthened glass sheet having surface compressive layers having a compressive stress of about 720 MPa at a DOL of about 46 μm and a calculated center tension region of about 37 MPa. The glass substrate had a CTE of $91\times10^{-7}/°$ C.

Five equidistant defects were introduced along one of the two 300 mm edges of the rectangular glass sheet. The defects were located on the top surface of the glass sheet by scoring the glass sheet with a carbide tip. A laser source was operated to emit a laser beam having a wavelength of about 10.6 μm and a power of about 105 W. The laser beam had a diameter of 1 mm that was defocused on the glass surface. A laser scanner rapidly scanned a laser beam back and forth over a straight cut line at a speed of about 2.5 m/s to produce a scanned laser line. The scanned laser line was about 250 mm and therefore longer than the length of the glass substrate (225 mm). After aligning the defects with the scanning laser beam, the glass substrate was sequentially cut into six pieces of the same size (50×225 mm).

To further cut each of the six pieces, mechanical edge defects were introduced to the middle of the six rectangular pieces along one of the 225 mm edges. The same procedures were repeated until 12 pieces of 50×122.5 mm were obtained.

It should now be understood that embodiments described herein may be utilized to cut chemically strengthened glass substrates. A defect may be formed on the glass substrate and a laser beam may be scanned along an entire length of a cut line to initiate a through vent that propagates along the cut line to separate a glass article from the glass substrate.

For the purposes of describing and defining the embodiments herein, it is noted that the terms "approximately," "about" and "substantially" are utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

It is noted that recitations herein of a component of the present invention being "configured" or "operable" in a particular way, "configured" or "operable" to embody a particular property, or function in a particular manner, are structural recitations as opposed to recitations of intended use. More specifically, the references herein to the manner in which a component is "configured" or "operable" denotes an existing physical condition of the component and, as such, is to be taken as a definite recitation of the structural characteristics of the component.

It is noted that one or more of the following claims utilize the term "wherein" as a transitional phrase. For the purposes of defining the embodiments described herein, it is noted that this term is introduced in the claims as an open-ended transitional phrase that is used to introduce a recitation of a series of characteristics of the structure and should be interpreted in like manner as the more commonly used open-ended preamble term "comprising."

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of cutting a glass article from a strengthened glass substrate comprising a surface compression layer and a tensile layer, the method comprising:
   forming an edge defect in the surface compression layer on a first edge of the strengthened glass substrate; and
   propagating a through vent through the surface compression and tensile layers at the edge defect by creating a tensile stress field within the strengthened glass substrate that is present from the first edge to a second edge of the strengthened glass substrate along an entire length of a cut line, wherein the tensile stress field is formed by scanning a laser beam back and forth along the entire length of the cut line on the surface compression layer at a scanning speed equal to or greater than 0.5 m/s, the tensile stress field is perpendicular to the cut line, and the through vent precedes a region of separation along the cut line between the glass article and the strengthened glass substrate.

2. The method of claim 1 wherein the scanning of the laser beam generates a scanned laser line that is equal to or greater than the length of the cut line.

3. The method of claim 1 wherein:
   the laser beam is scanned at a reference scanning speed when the laser beam is at a normal incidence angle relative to the strengthened glass substrate; and
   the laser beam is scanned at a decreasing scanning speed that decreases from the reference scanning speed in accordance with an increasing angle of incidence of the scanned laser beam as the laser beam is scanned along the cut line.

4. The method of claim 1 wherein propagating the through vent at the edge defect further comprises:
scanning a laser beam back and forth along an entire length of the cut line; and
scanning the laser beam back and forth along a shortened scan line on the edge defect after scanning the laser beam back and forth along the entire length of the cut line for a period of time.

5. The method of claim 1 wherein the edge defect is formed by laser ablation or laser induced damage in a bulk region of the strengthened glass substrate.

6. A method of cutting a glass article from a strengthened glass substrate comprising a surface compression layer and a tensile layer, the method comprising scanning a laser beam incident on the surface compression layer and back and forth at a scanning speed equal to or greater than 0.5 m/s along an entire length of a cut line between the glass article and the strengthened glass substrate to create a tensile stress field that is present along an entire length of the cut line such that a through vent propagates along the cut line, wherein the scanning of the laser beam generates a scanned laser line present along the entire length of the cut line on the surface compression layer.

7. The method of claim 6 wherein the scanned laser line is equal to or greater than the length of the cut line.

8. The method of claim 6 wherein:
the laser beam is scanned at a reference scanning speed when the laser beam is at a normal incidence angle relative to the strengthened glass substrate; and
the laser beam is scanned at a decreasing scanning speed that decreases from the reference scanning speed in accordance with an increasing angle of incidence of the scanned laser beam as the laser beam is scanned along the cut line.

9. The method of claim 6 further comprising forming an edge defect on a first edge of the strengthened glass substrate, wherein the through vent initiates at the edge defect and precedes a region of separation along the cut line between the glass article and the strengthened glass substrate.

10. The method of claim 9 further comprising scanning the laser beam back and forth along a shortened scan line on the edge defect after scanning the laser beam back and forth along the entire length of the cut line for a period of time.

11. A method of cutting a strengthened glass substrate comprising a surface compression layer and a tensile layer, the method comprising:
forming an edge defect on the surface compression layer of the strengthened glass substrate, the edge defect positioned on a cut line extending from a first edge of the strengthened glass substrate to a second edge of the strengthened glass substrate; and
scanning a laser beam back and forth to generate a scanned laser line that extends along an entire length of the cut line to separate the strengthened glass substrate along the cut line, wherein the laser beam is scanned back and forth along the entire length of the cut line at a scanning speed equal to or greater than 0.5 m/s.

12. The method of claim 11 wherein the scanned laser line is equal to or greater than the length of the cut line.

13. The method of claim 11 wherein the cut line begins at a first edge of the strengthened glass substrate and terminates at a second edge of the strengthened glass substrate.

14. The method of claim 11 wherein the cut line begins and terminates at a single edge of the strengthened glass substrate.

15. The method of claim 11 wherein the method further comprises scanning the laser beam back and forth along a shortened scan line on the edge defect following scanning the laser beam back and forth along the entire length of the cut line.

16. The method of claim 11 wherein the laser beam is generated by a pulsed $CO_2$ laser operated at a frequency within a range of 0 Hz to 200 kHz.

17. The method of claim 11 wherein the method further comprises shaping the laser beam such that the laser beam illuminates an elliptical beam spot on the strengthened glass substrate, the elliptical beam spot having a major axis that is aligned with the cut line.

18. The method of claim 11 wherein the method further comprises applying a water jet to the edge defect after scanning the laser beam along the entire length of the cut line for a period of time.

19. The method of claim 1 wherein the through vent propagates through the surface compression and tensile layers at a speed of about 1.3 km/s.

* * * * *